United States Patent
Fa et al.

(10) Patent No.: US 10,102,249 B2
(45) Date of Patent: Oct. 16, 2018

(54) DATA STRUCTURE CREATION USING ORDERED APPLICATION OF TRAVERSAL RULES

(71) Applicant: SIEMENS PRODUCT LIFECYCLE MANAGEMENT SOFTWARE INC., Plano, TX (US)

(72) Inventors: Mingxian Fa, Irvine, CA (US); Reiner K. Kaiser, Redondo Beach, CA (US); Wei Zhao, Irvine, CA (US); Michael Wibowo, Milford, OH (US)

(73) Assignee: Siemens Product Lifecycle Management Software Inc., Plano, TX (US)

( * ) Notice: Subject to any disclaimer, the term of this patent is extended or adjusted under 35 U.S.C. 154(b) by 603 days.

(21) Appl. No.: 14/705,447

(22) Filed: May 6, 2015

(65) Prior Publication Data

US 2016/0328449 A1    Nov. 10, 2016

(51) Int. Cl.
  *G06F 17/30* (2006.01)

(52) U.S. Cl.
  CPC .. *G06F 17/30507* (2013.01); *G06F 17/30528* (2013.01)

(58) Field of Classification Search
  CPC combination set(s) only.
  See application file for complete search history.

(56) References Cited

U.S. PATENT DOCUMENTS

| | | | | |
|---|---|---|---|---|
| 8,458,228 B2 * | 6/2013 | Ben-Haim | ............ | G06Q 10/067 707/802 |
| 8,533,237 B2 * | 9/2013 | Evans | ............... | G06F 17/30961 706/11 |
| 9,026,529 B1 * | 5/2015 | Osofsky | ............ | G06F 17/30864 702/181 |
| 9,053,254 B2 * | 6/2015 | Carter | ..................... | G06F 17/50 |
| 9,075,799 B1 * | 7/2015 | Tellefsen | ................ | G06F 17/30 |
| 9,529,507 B2 * | 12/2016 | Carter | ..................... | G06F 17/50 |

(Continued)

OTHER PUBLICATIONS

Ding, Lian, Alexander Ball, Jason Matthews, Christopher A. McMahon, and Manjula Patel. "Product representation in lightweight formats for product lifecycle management (PLM)." In 4th International Conference on Digital Enterprise Technology. University of Bath, 2007.*

(Continued)

*Primary Examiner* — Farhan Syed

(57) ABSTRACT

A system is provided that carries out object traversal in a product lifecycle management system. The system may process a received set of traversal rules in a determined precedence order for a received list of input objects to recursively acquire from a data store a list of child objects related to the input objects based on the traversal rules. The traversal rules may be processed in the precedence order determined based at least in part on a number of parent types in a hierarchical arrangement that specifies relationships between object types for a source type of object specified by each respective traversal rule. For each respective traversal rule, a set based query may be carried out on the data store to determine child objects for the input objects having one of a type or a parent type corresponding to the source type associated with the respective traversal rule.

14 Claims, 8 Drawing Sheets

(56) References Cited

U.S. PATENT DOCUMENTS

| | | | |
|---|---|---|---|
| 2009/0234826 A1* | 9/2009 | Bidlack | G06F 17/30489 |
| 2011/0179059 A1* | 7/2011 | Kaiser | G06F 17/30513 |
| | | | 707/769 |
| 2013/0132432 A1* | 5/2013 | Carter | G06F 17/50 |
| | | | 707/770 |
| 2013/0246451 A1* | 9/2013 | Kaiser | G06F 17/30587 |
| | | | 707/769 |
| 2015/0234560 A1* | 8/2015 | Carter | G06F 3/0484 |
| | | | 715/744 |

OTHER PUBLICATIONS

Liu, Wei, Yong Zeng, Michael Maletz, and Dan Brisson. "Product lifecycle management: a survey." In Proceedings of the ASME 2009 International Design Engineering Technical Conferencec & Computers and Information in Engineering Conference IDETC/CIE. San Diego, California, USA, pp. 1213-1225. 2009.*

Alemanni, M., F. Destefanis, and E. Vezzetti. "Model-based definition design in the product lifecycle management scenario." The International Journal of Advanced Manufacturing Technology 52, No. 1 (2011): 1-14.*

\* cited by examiner

FIG. 2

| Rule | Source Type | Relation type or property name | Destination Type | Direction | Condition | Action: |
|---|---|---|---|---|---|---|
| Rule6 | MyItemRevision | CustomRelType | MatchAll | Forward | isTrue | CopyAsObject |
| Rule1 | ItemRevision | IMAN_specification | UGPART | Forward | isTrue | CopyAsObject |
| Rule2 | ItemRevision | IMAN_specification | MatchAll | Forward | isTrue | CopyAsObject |
| Rule3 | ItemRevision | MatchAll | Dataset | Forward | isTrue | CopyAsReference |
| Rule4 | ItemRevision | MatchAll | MatchAll | Forward | isTrue | CopyAsReference |
| Rule5 | ItemRevision | Items_tag | Item | Forward | isTrue | CopyAsObject |

FIG. 3

| The Set of Input Objects |
|---|
| ItemRevision1 |
| MyItemRevision1 |
| PartRevision1 |
| MyItemRevision2 |
| ItemRevision2 |

FIG. 5

| Type | TypeBucket | |
|---|---|---|
| ItemRevision | ItemRevision1<br>ItemRevision2 | ← 502 |
| MyItemRevision | MyItemRevision1<br>MyItemRevision2 | ← 504 |
| PartRevision | PartRevision1 | ← 506 |

508 points to Type column. 500 refers to the whole table.

FIG. 6

| Rule | Object Set per Rule | |
|---|---|---|
| Rule6 | MyItemRevision1<br>MyItemRevision2 | ← 602 |
| Rule1 | ItemRevision1<br>ItemRevision2<br>MyItemRevision1<br>MyItemRevision2<br>PartRevision1 | ← 604 |
| Rule2 | ItemRevision1<br>ItemRevision2<br>MyItemRevision1<br>MyItemRevision2<br>PartRevision1 | ← 606 |
| Rule3 | ItemRevision1<br>ItemRevision2<br>MyItemRevision1<br>MyItemRevision2<br>PartRevision1 | ← 608 |
| Rule4 | ItemRevision1<br>ItemRevision2<br>MyItemRevision1<br>MyItemRevision2<br>PartRevision1 | ← 610 |
| Rule5 | ItemRevision1<br>ItemRevision2<br>MyItemRevision1<br>MyItemRevision2<br>PartRevision1 | ← 612 |

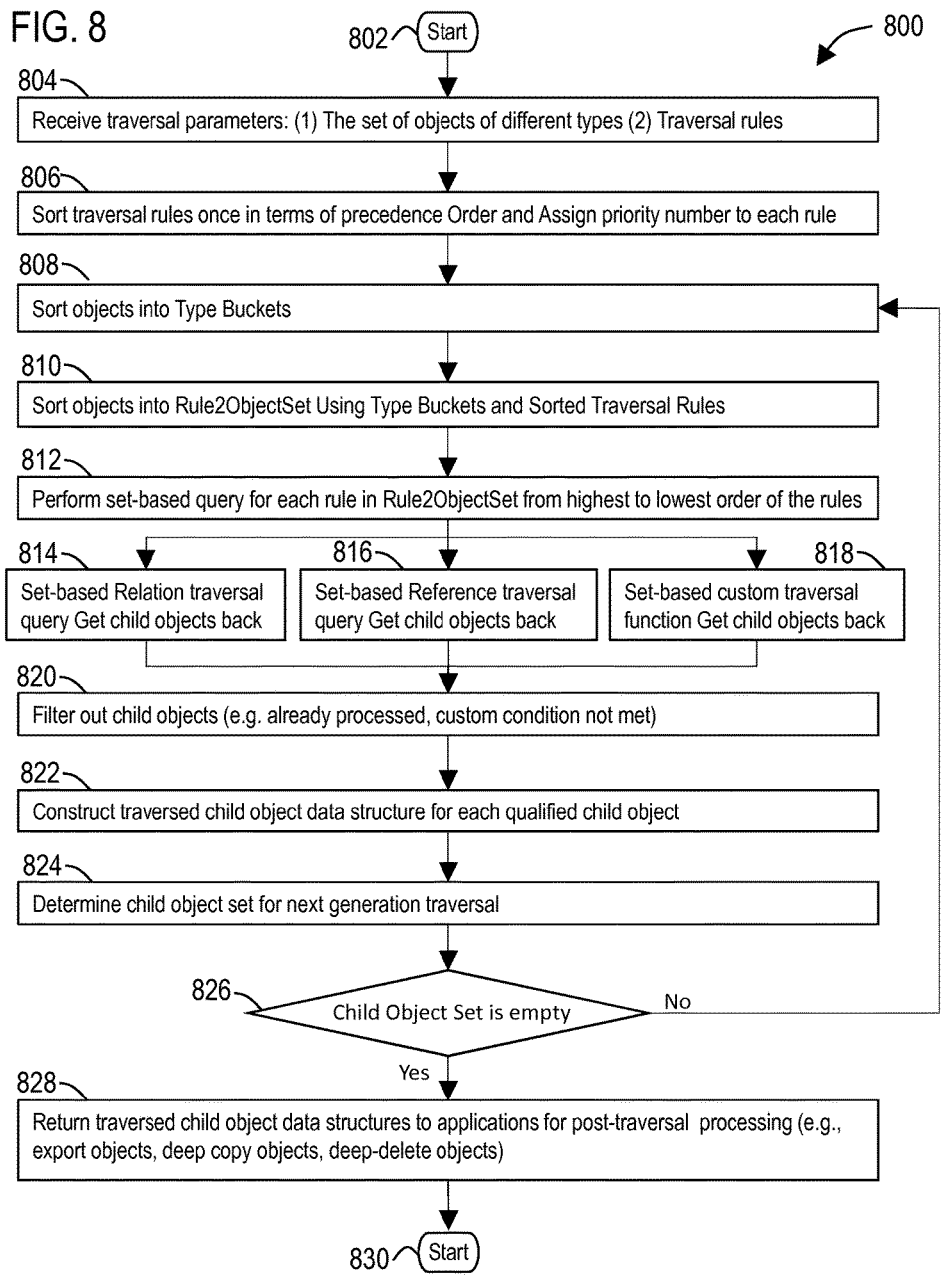

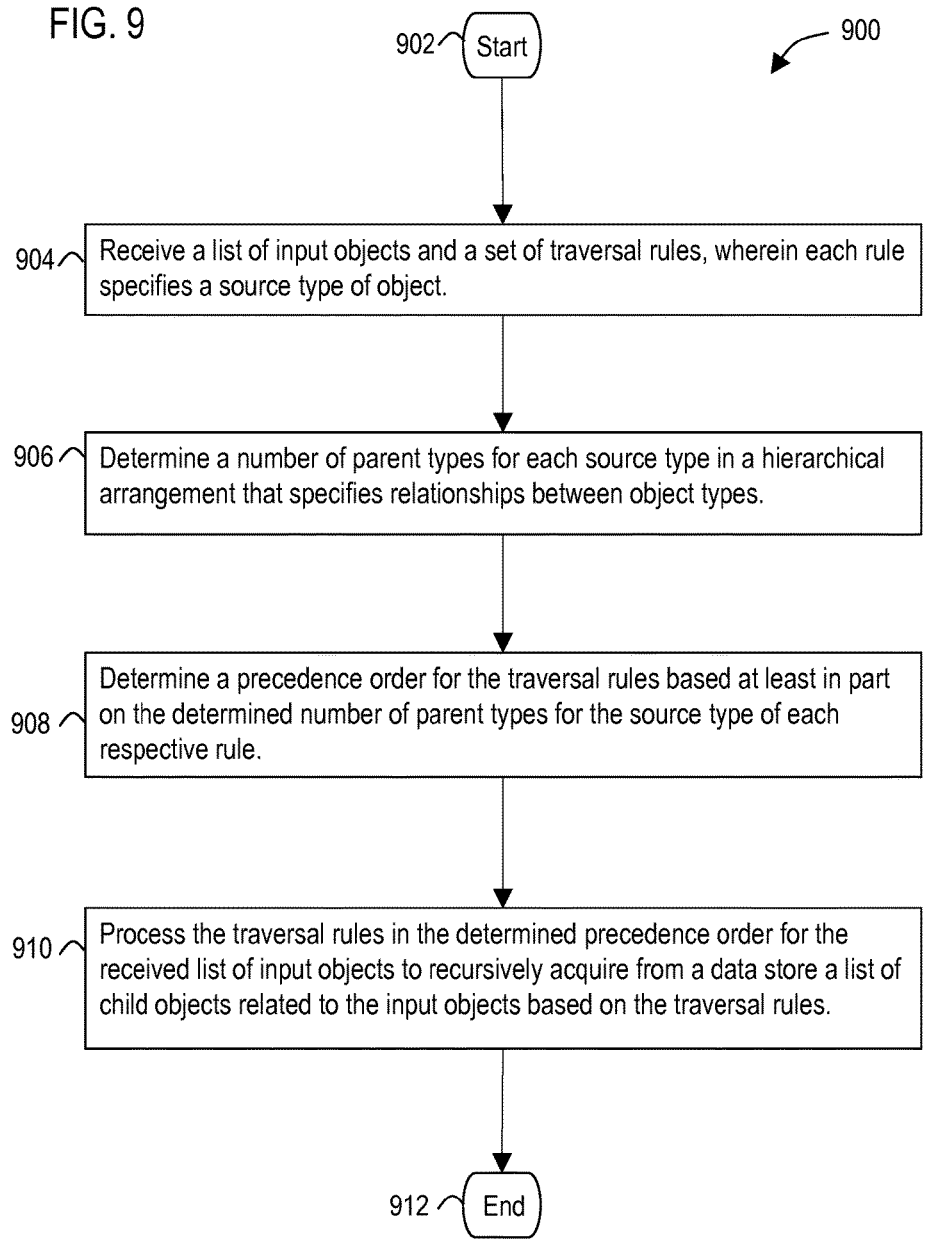

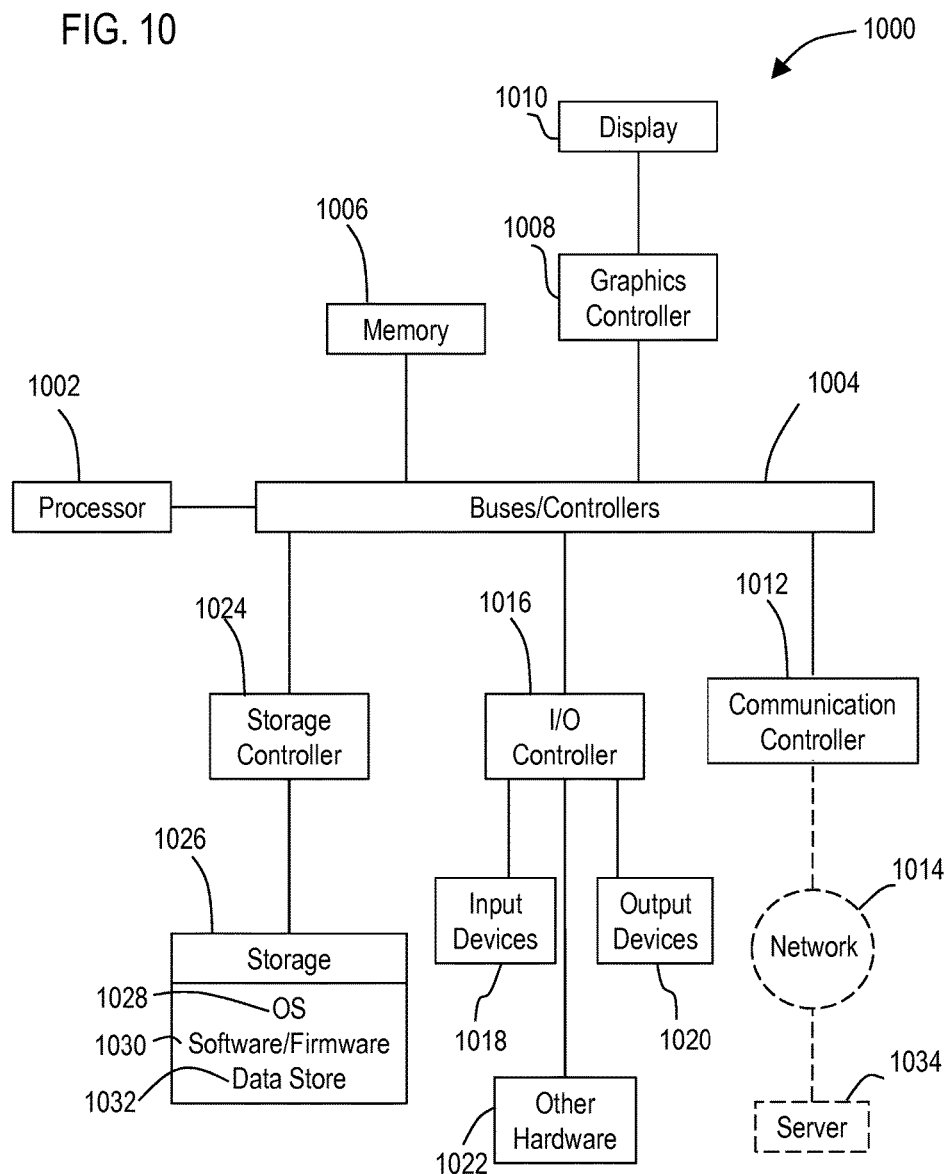

DATA STRUCTURE CREATION USING ORDERED APPLICATION OF TRAVERSAL RULES

TECHNICAL FIELD

The present disclosure is directed, in general, to computer-aided design, visualization, and manufacturing systems, product data management (PDM) systems, product lifecycle management ("PLM") systems, and similar systems, that manage data for products and other items (collectively referred to herein as product systems).

BACKGROUND

Product systems such as PDM and PLM systems may be used to manage large databases of product data. Product systems may benefit from improvements.

SUMMARY

Variously disclosed embodiments include systems and methods that may be used to traverse objects in a PLM system or other type of system that manages data. In one example, a system may comprise at least one processor configured to process a received set of traversal rules in a determined precedence order for a received list of input objects to recursively acquire from a data store a list of child objects related to the input objects based on the traversal rules, which traversal rules respectively specify a source type of object and which precedence order is determined based at least in part on a number of parent types for each source type in a hierarchical arrangement that specifies relationships between object types.

In another example, a method may include various acts carried out through operation of at least one processor. Such acts may include receiving a list of input objects and a set of traversal rules, wherein each rule specifies a source type of object. The acts may also include determining a number of parent types for each source type in a hierarchical arrangement that specifies relationships between object types. In addition, the acts may comprise determining a precedence order for the traversal rules based at least in part on the determined number of parent types for the source type of each respective rule. Further, the acts may include processing the traversal rules in the determined precedence order for the received list of input objects to recursively acquire from a data store a list of child objects related to the input objects based on the traversal rules.

A further example may include non-transitory computer readable medium encoded with executable instructions (such as a software component on a storage device) that when executed, causes at least one processor to carry out this describe method.

The foregoing has outlined rather broadly the technical features of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiments disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the Detailed Description below, it may be advantageous to set forth definitions of certain words or phrases that may be used throughout this patent document. For example, the terms "include" and "comprise," as well as derivatives thereof, mean inclusion without limitation. The singular forms "a", "an" and "the" are intended to include the plural forms as well, unless the context clearly indicates otherwise. Further, the term "and/or" as used herein refers to and encompasses any and all possible combinations of one or more of the associated listed items. The term "or" is inclusive, meaning and/or, unless the context clearly indicates otherwise. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

In addition, phrases such as "processor is configured to" carry out one or more functions or processes, may mean the processor is operatively configured to or operably configured to carry out the functions or processes via software, firmware, and/or wired circuits. For example a processor that is configured to carry out a function/process may correspond to a processor that is actively executing the software/firmware which is programmed to cause the processor to carry out the function/process and/or may correspond to a processor that has the software/firmware in a memory or storage device that is available to be executed by the processor to carry out the function/process. It should also be noted that a processor that is "configured to" carry out one or more functions or processes, may correspond to a processor circuit particularly fabricated or "wired" to carry out the functions or processes (e.g., an ASIC or FPGA design).

Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

FIG. 2 illustrates a table of example traversal rules sorted in a precedence order.

FIG. 3 illustrates an example list of input objects.

FIG. 5 illustrates input objects grouped in type buckets.

FIG. 6 illustrates example rule/object sets sorted by the precedence order.

FIGS. 8 and 9 illustrate flow diagrams of example methodologies that facilitate providing object traversal.

FIG. 10 illustrates a block diagram of a data processing system in which an embodiment can be implemented.

DETAILED DESCRIPTION

Figure 1:
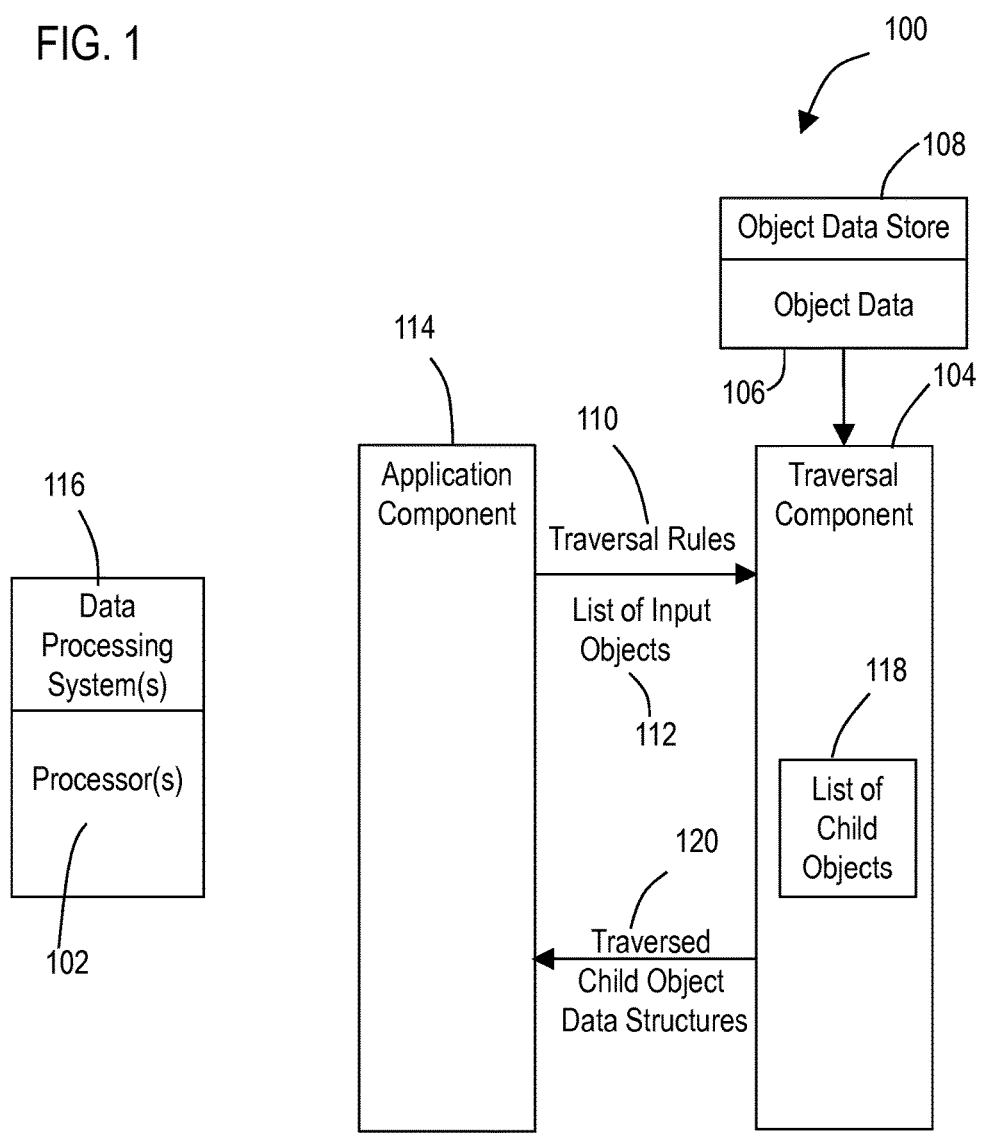
FIG. 1 illustrates a functional block diagram of an example system that facilitates object traversal.

Various technologies that pertain to product systems and other data intensive applications will now be described with reference to the drawings, where like reference numerals represent like elements throughout. The drawings discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged apparatus. It is to be understood that functionality that is described as being carried out by certain system components may be performed by multiple components. Similarly, for instance, a component may be configured to perform functionality that is described as being carried out by multiple components. The numerous innovative teachings of the present application will be described with reference to exemplary non-limiting embodiments.

Many forms of data, such as PLM data can be very complex with multiple references, dependencies, and a large number of different classes that may need to be traversed and processed in order to collect all data required for a particular operation using the data. Example embodiments of systems and methods described herein may be used to carry out high speed bulk data traversal and processing while minimizing the required number of database queries, and therefore maximizing performance and throughput.

With reference to FIG. 1, an example system 100 that facilitates traversal of data is illustrated. The system 100 may include at least one processor 102 that is configured with one or more software components to carry out the various features described herein. An example software component may include a traversal component 104 that is executed by the at least one processor (referred to herein as "the processor 102" in this example).

As will be described in more detail below, the traversal component may access and retrieve object data 106 stored in an object data store 108. In an example embodiment, the object data in the data store 108 may correspond to persistent records stored in a data base and/or calculated runtime data determined form data stored in a database. Examples of databases that may be used as one or more data stores described herein include database server applications such as Oracle, Microsoft SQL Server, or any other type of data store that is operative to store data records.

In example embodiments, the traversal component may cause the processor to receive a set of traversal rules 110 for a received set of input objects 112, which are used to determine how to access object data from the object data store 108. Such traversal rules and input objects may be received from one or more application components 114 (e.g., software) executing in the processor 102 or some other processor (which processors communicate with each other through a network connection for example).

In some examples, the traversal component may receive such traversal rules and input objects via an API that is accessible to application components 114 for purposes of communicating the traversal rules and input objects to the traversal component. In another embodiment, the traversal component may correspond to a server component that receives TCP/IP communications (including the traversal rules and input objects) from one or more application components 114. In a further embodiment the traversal component may retrieve the traversal rules and input objects from a data store.

In example embodiments, the processor 102 may be included in a data processing system 116. In FIG. 1, only one data processing system 116 is illustrated and in some embodiments, the traversal component 104, application component 114, and data store 108 may execute in the same physical data processing system. However, it should be appreciated that the data processing system 116 may correspond to a distributed system in which the traversal component, application component, data store, and/or different portions thereof (e.g., sub-components, modules, routines, functions) may execute in one or more different physical data processing systems (i.e., severs, clients) connected via a network. Further in a virtual machine or network cloud environment, each data processing system may correspond to a virtual machine running in one or more physical data processing systems (servers).

In an example embodiment, the described traversal component is operative to recursively acquire from the data store 108 object data 106 for child objects 118 related to the input objects 112 based on the traversal rules 110. Such traversal rules provide instructions for how the traversal component is to traverse through the object data 106 in the data store 108 in order to acquire objects related to the input objects. For example, a traversal rule may specify a source type of object, a destination type of object and a relationship that is used to determine how to correlate source and destination types of objects. Also, it should be understood that each of these different object types in the data store may be organized in a hierarchical arrangement that specifies relationships between objects types. In such an arrangement, an object type may include a parent object type, which may also include a parent object type, and so forth for several generations of related types of objects.

In an example, the traversal component causes the traversal rules to be processed by the processor in a precedence order determined by the processor based at least in part on a determined number of parent types (i.e., parent generations) in the hierarchical arrangement for a source type of object that the respective traversal rule specifies.

As will be explained in more detail below, the processing of input objects for a set of traversal rules produces a list of child objects 118 retrieved from the data store 108. Such child objects added to the list of child objects may then be processed (iteratively) according to the traversal rules to determine further child objects to add to the list of child objects, until no further child objects remain to be processed. It should also be appreciated that the traversal component may be operative to forego adding child objects and further child objects to the list of child objects that are already in the list of child objects. In addition, the traversal component may be operative to associate with each child object the particular traversal rule that was first used to determine the child object from the data store.

The determined child objects 118 may then be organized into a hierarchical format referred to herein as one or more traversed child object data structures 120, which are communicated by the traversal component to the application component 114. Such one or more child object data structures 120 communicated to the application component 114 may include data which specifies each respective child object, the source object related to the respective child object, the particular relationship between the respective child object and the source object that was used to determine the respective child object, a list of determined further child objects related to the respective child object, and the traversal rule that initially determined the respective child object.

In order to access the object data, the traversal component may generate SQL queries based on the information provided in the traversal rules. Examples of traversal rules and SQL queries generated therefrom for use with accessing hierarchically organized object data stored in a relational database is described in U.S. Publication No. 2011/0179059 A1 published Jul. 21, 2011, which is hereby incorporated herein by reference in its entirety. Also, example processes of using traversal rules (such as closure rules) with respect to runtime objects (such as Bill of Material lines) is described in U.S. Publication No. 2013/0246451 A1 published Sep. 19, 2013, which is hereby incorporated herein by reference in its entirety.

The described example traversal component may be used to process object data in a PLM system such as Teamcenter produced by Siemens Product Lifecycle Management Software Inc., of Plano Tex. However, it should be appreciated that the systems and methods described herein may be used in other product systems (e.g., PLM, PDM systems) and/or any other type of system that stores hierarchically data in a relational database.

In a PLM system (such as Teamcenter), declarative traversal rules are used to specify what relationships between objects to traverse and what action to perform when the relationship of interest is traversed. Such rules are used pervasively to develop various applications. For example, the closure rules are used to specify how object structures are traversed through their relationships, and whether the traversed objects need to be processed and traversed further.

The closure rule-based traversal may be used to develop applications such as data replication of large Bill of Material (BOM) structures across multi-sites, BOM structure indexing, and BOM structure data mapping for analysis. Similar traversal rules may also be used for other applications, such as compound property rules for defining a compound property for an object out of a source property on another object; deep copy rules for developing object deep copy functionality and BOM structure duplication; navigation rules for a relation browser application; and other application operations such as bulk delete, bulk save, bulk lock, and unlock.

However, it should be understood that the syntax of the traversal rules for the described systems and methods may be different than the syntax of the traversal rules associated with released versions of Teamcenter and U.S. Publication Nos. 2011/0179059 and 2013/0246451. For example, version 10.1 of Teamcenter may include a traversal rule that specifies traversal actions to take. However, in example embodiments described herein, the traversal rule may be application neutral. The traversal rules may have a format usable for any type of application and thus may not specify a traversal action. Rather the traversal component may be operative to acquire and return bulk object data as described herein to a calling application, which carries out actions using the returned object data.

Such an application may further process the object data for a particular task, e.g., deep-copy, BOM structure duplication, navigation, searches, export, bulk delete/save/lock/unlock or any other application/operation which may involve retrieving a precise set of child objects related to one or more input objects. Existing applications may be adapted to use the described traversal component by translating existing rules to the unified traversal rule format described herein. Further, new applications can be written based on the unified traversal rule format for declaring their traversal rules. In an example embodiment for use with Teamcenter, applications and operations associated with functions such as TcXML, SaveAs and Revise, and REVBOM may be adapted to use the traversal component described herein.

It should be understood that rule-based traversal of object data can be time-consuming when dealing with thousands of records in a data store. For example, one method for traversal of object data may involve loading all the related objects for a target object, and match each related object to an applicable rule. This may be done recursively for multiple generations of the related objects. The performance of this method is largely determined by the number of the related objects and the number of the rules, which may be very slow and may not scale well compared to other examples described herein. For example, this method may not be practical for handling large sets of data, such as when traversing a large BOM structure for structure duplication.

To enhance the performance of object traversal, another approach is to sort target objects into their type buckets in terms of their class, determine the rules defined for the class and parent classes and for each class bucket, construct set-based queries for each rule to query for the traversed objects for all the objects in the class bucket. The performance of this method may be largely determined by the number of the class buckets and the number of the rules applicable to the class of each class bucket. However, this method may not scale well for a deep class hierarchy scenario.

Example embodiments described herein may be operative to scale more efficiently for deep class hierarchy scenarios. As discussed previously with respect to FIG. 1, such an embodiment may include a traversal component 104 that is configured to receive sets of traversal rules 110 and a set of input objects 112 (from an application component 114). FIG. 2 illustrates an example table 200 showing six traversal rules 202 (rules 1-6) for a set of traversal rules 110 that may be received by the traversal component. Each rule may be comprised of a source type 204, a relationship 206, a destination type 208, a direction 210, and a condition 212 (specifying the rule is applied under a certain condition).

In general, traversal rules are used by applications for a variety of different actions. In the example shown in FIG. 2, Rules 1, 2, 5, and 6 may be used to determine objects for a CopyAsObject action carried out by the application component. Also for example Rules 3 and 4 may be used to determine objects for a CopyAsReference action carried out by the application component. The actions CopyAsObject and CopyAsReference are examples used by a deep copy application component used in a PLM application.

FIG. 3 illustrates an example table 300 of five input objects 302 for a set of input objects 112 that may be received by the traversal component. In this example, the input objects may correspond to specific objects associated with revisions of parts of an assembly that are stored in the data store (e.g., ItemRevision1, MyItemRevision1, PartRevision1, MyItemRevision2, ItemRevision2). However, it should be appreciated that in an example implementation of the described system, rather than receiving alphanumeric descriptive names of input objects (such as depicted in table 300), the input objects received form an application may include unique object identifiers (Ids) associated with each input object in the data store.

Figure 4:
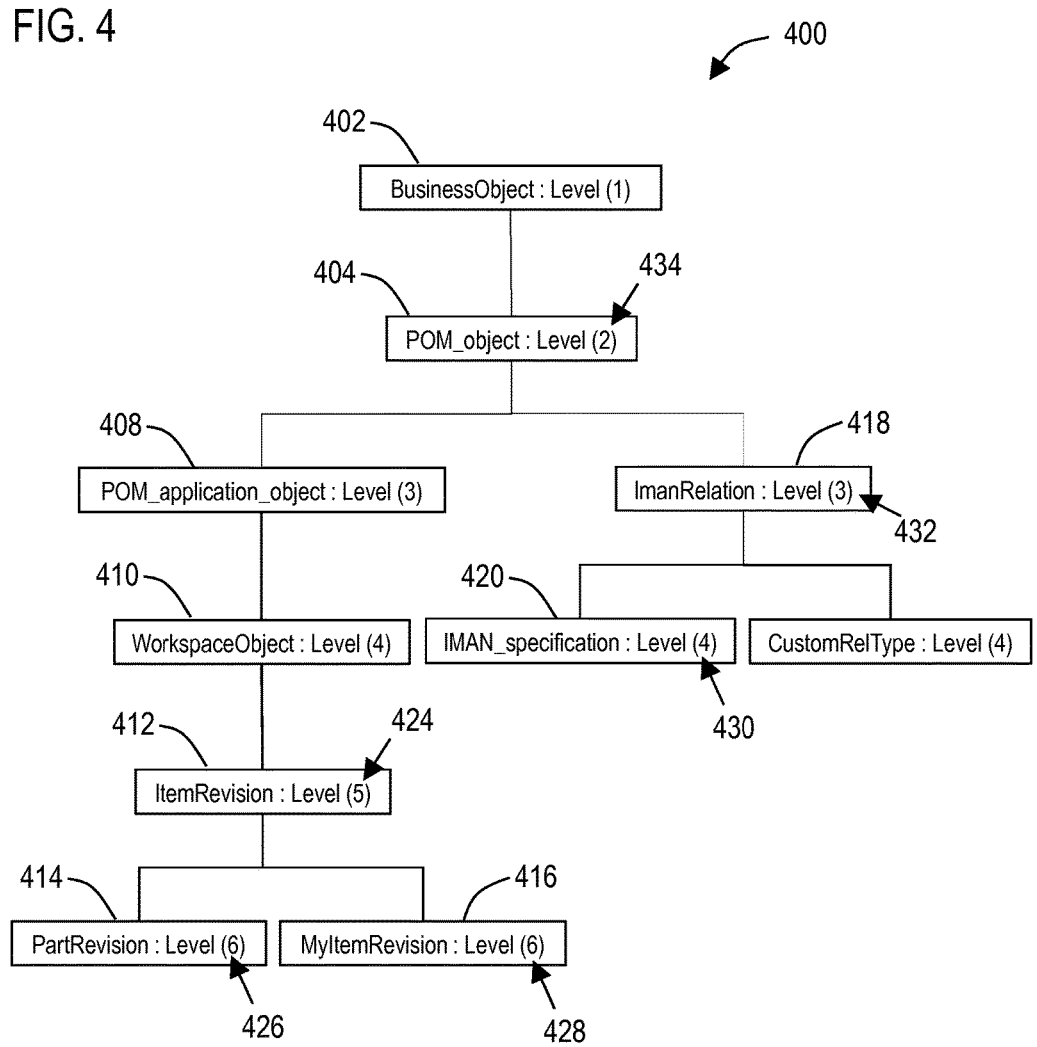
FIG. 4 illustrates an example hierarchy of object types stored in a data store.

FIG. 4 illustrates a portion 400 of an example hierarchical arrangement of object types stored in a data store, for which the input objects (shown in FIG. 3) may be related (via their types) in a persistent object model (POM) object type structure for a PLM system such as Teamcenter. In this example, input objects: ItemRevision1 and ItemRevision2 may correspond to product revisions that have the same object type of ItemRevision 412. Similarly, input objects: ProductRevision1 and Product Revision2 may correspond to product revisions that have the same object type of ProductRevision 414. Also input objects: MyItemRevision1 and My ItemRevision2 may correspond to product revisions that have the same object type of MyItemRevision 416. Also as illustrated in FIG. 4, the ProductRevision and MyItemRevision object types are child object types of the ItemRevision object type.

It should be appreciated that in some instances, items lower in such an object type hierarchy may have less children objects associated therewith than items higher in the object type hierarchy. Thus rules with source objects lower in the object type hierarchy may relate to fewer objects than rules with source objects higher in the object type hierarchy. In example embodiments, traversal rules may be organized in terms of precedence, in which a traversal rule defined at a child source type is accorded higher precedence than a traversal rule defined at a parent source type. In example embodiments, traversal rules may be sorted for processing in order of their precedence order. In other words the traversal rules may be sorted so as to processes the traversal rules in order of highest to lowest precedence determined by the number of parent types for their respective source types.

Referring back to FIG. 2, in an example embodiment, the traversal rules may be sorted by computing and assigning a level number to the specified source type 204, relationship 206, and destination type 208 for each traversal rule. The level number for an object type may be 1+the number of its parent types.

For example, as illustrated in FIG. 4 for a PLM system such as Teamcenter, the object type ItemRevision 412 has the following parent types: WorkspaceObject 410, POM_application_object 408, POM_object 404, and BusinessObject 402. The number of parent types is 4 for the ItemRevision 412 object type. Thus, in this example the computed level number 424 for object type ItemRevision 412 is 5. In other words, object type ItemRevision 412 is located at Level 5 in the type hierarchical arrangement for this example PLM system. In contrast PartRevision 414 object type and MyItemRevision 416 object type are child types of the ItemRevision 412 object type and thus have 5 parent types. The computed level numbers 426, 428 for object types PartRevision 414 and MyItemRevision 416 would thus be 6 in this example. In other words, PartRevision and MyItemRevision object types are located at Level 6 in the type hierarchical arrangement.

An example embodiment of the traversal component may calculate the level number for a type by carrying out a recursive function on the data store that does a bottom-up traversal from the given type to the respective top most parent type in the data store. However, it should be appreciated that in other embodiments, the level number associated with each type may be determined by other components in the system and stored in the data store for later retrieval by the traversal component when determining the order of a received set of retrieval rules.

Relationships corresponding to relation types specified in a traversal rule may also be part of the persistent object type hierarchy (such as illustrated in FIG. 4). Thus level numbers may be computed for relation types in the same manner as level numbers for source types. For example with respect to FIG. 4, relations have a common base type: ImanRelation 418, which is subtype of POM_object 404. Thus the computed level number 430 for relationship IMAN_Specification 420 is 4 in Rules 1 and 2.

In addition example traversal rules may include wildcard type instructions such as the "MatchAll" instruction, which is used to specify an object traversal using all applicable relation types for a set of source and destination objects. In terms of ordering traversal rules, if the relation type of a traversal rule is MatchAll (i.e. any relation type), the level number for a MatchAll instruction is the same as the level number of the relation base type ImanRelation 418, which has a level number 432 of 3 as shown in FIG. 4.

It should also be noted that objects may reference other objects in an independent relationship that is not defined by a relation type that is part of a persistent object type hierarchical arrangement stored in a data store (such as illustrated in FIG. 4). For example an ItemRevision object may have a property such as "items_tag" that can be used to reference an Item object. An example traversal rule can also be defined on such a reference property in the relationship information (See "items_tag" property reference for the relationship in Rule 5 in FIG. 2). Since such reference properties are not defined by the example hierarchical arrangement illustrated in FIG. 4, an example embodiment may not accord level numbers to reference property type of relationships via computing the number of parent types. Rather, relationships for reference properties may be accorded a lowest level number (such as 0) for purposes of sorting traversal rules. Also it should be noted that a "MatchAll" wildcard instruction may not be used with a reference property relationship.

In example embodiments, the destination types specified in traversal rules may also be part of the persistent object type hierarchical arrangement stored in a data store. Thus the calculated level number may be determined for the destination type for each traversal rule in a similar manner described above with respect to source type and relation type level numbers. Also, if the destination type of a traversal rule is MatchAll (i.e. any destination type), the level number for the MatchAll instruction may be the same as the level number 434 of POM_object 404, which has level number 2, because POM_object is the common base type for all the persistent types in the described type hierarchical arrangement.

In addition, it should be noted that the data shown for the traversal rules depicted in FIG. 2 are shown with word names for the object types and other specified instructions. However, it should be appreciated that in example implementations, the data that represents such traversal rules may use unique identifiers for each type and/or other types of symbols (e.g., a wildcard symbol such as "*" for the "MatchAll" instruction) or any other data that can be parsed by the traversal component to determine the function of the traversal rule.

With level numbers determined in this manner, the precedence order for the traversal may be determined by the traversal component sorting the traversal rules: firstly by comparing the level numbers of the source types of each rule; secondly (when the source types have the same level numbers) by comparing the level numbers of the relationships of each rule; and thirdly (when the source types have the same level numbers and the relationships have the same level numbers) comparing the level numbers of the destination types of each rule. In this example, higher level numbers correspond to higher precedence, and higher precedence rules are used by the traversal component before lower precedence rules when accessing objects from the data store.

With reference to FIG. 2, the traversal rules 110 in this example may have been received from the application component in an order from Rule 1 to Rule 6. However, based on the level numbers determined for the respective source type 204, relationship 206, and destination type 208 for each rule, the traversal rules may be sorted by the traversal component in a precedence order 214 as show in the table 200 with Rule 6 having the highest precedence. In this example, Rule 6 has the highest precedence because the source type: MyItemRevision has a higher computed level number 428 (i.e., 6 in this example) than the computed level number 424 of the source type: ItemRevision (i.e., 5 in this example). In addition, Rules 1 and 2 are higher in order than Rules 3 and 4, because the Relation type: IMAN_specification has a computed higher level number 430 (i.e., 4 in this example) than that of the wildcard: MatchAll instruction in Rules 3 and 4 (i.e., 3 in this example). Also Rule 1 has a higher precedence order than Rule 2 because the destination type: UGPART in Rule 1 has a computed higher level number (not shown in FIG. 4) than the computed level number of the wildcard: MatchAll in Rule 2 (i.e., 2 in this example). In addition, Rule 5 is sorted below Rule 4 because the items_tag property reference relationship has a lower computed level number (such as 0) than the computed level number (i.e., 3 in this example) accorded to the MatchAll relation type relationship in Rule 4.

In a PLM application such as Teamcenter, the traversal component may determine precedence order of the rules based in part by using an algorithm which uses a "compare" function for the standard "qsort" function. However, it should be appreciated that in other applications and examples, other algorithms or functions may be used to carry out the described ordering of the traversal rules in terms of precedence firstly by source type, secondly by relationship, and thirdly by destination type.

In addition, as illustrated in FIG. 2, each traversal rule may be associated with a Direction instruction 210 that specifies whether the traversal query is made from source type to destination type (i.e., Forward) or from destination type back to source type (i.e., Backward). Also, as illustrated in FIG. 2, each traversal rule may include a condition expression 212 which corresponds to a filter having an expression that is evaluated to determine if the rule is active.

In an example embodiment, the traversal component may correlate one or more input objects 302 to specific traversal rules 202 based on the type and/or the parent type of the input object. This may be carried out by the traversal component organizing the input objects into groups called type buckets, where objects of the same type are put together.

FIG. 5 illustrates an example table 500 in which input objects are grouped into type buckets based on the object type 508 for each object. In this example, input objects: ItemRevsion1 and ItemRevsion2, are objects of type ItemRevision, and thus are grouped together into a common type bucket 502. Similarly input objects MyItemRevsion1 and MyItemRevsion2, are objects of object type MyItemRevision, and thus are grouped together into a common type bucket 504. Also, the input object PartRevision1 is an object of object type PartRevision, and thus is grouped by itself in type bucket 506.

Once input objects are grouped into type buckets, the traversal component may then associate type buckets with traversal rules. In this example the traversal component may associate the input objects for type buckets to particular rules in which the source type 204 for a rule corresponds to the type or the parent type of the object type 508 for the type bucket 502, 504, 506. The parent object type for each object type may be determined from the hierarchical arrangement depicted in FIG. 4 in this described example.

The grouping of type buckets with a traversal rule is referred to herein as a Rule2ObjectSet. FIG. 6 illustrates an example table 600 of Rule2ObjectSets that may be formed from the example traversal rules 202 in table 200 (sorted in precedence order) and the type buckets 302 in table 300 determined by the described example traversal component.

In this example, the traversal component associates input objects ItemRevision1 and ItemRevision2 with Rules 1-5 (as shown in FIG. 6), because the object type for their type bucket 502 (as shown in FIG. 5) of ItemRevision matches the source type 204 of ItemRevision (as shown in FIG. 2) for these traversal rules. Also for example, the traversal component associates input object PartRevision1 with Rules 1-5, because the parent object type of ItemRevision for object type PartRevision of type bucket 506 matches the source type 204 ItemRevision of these traversal rules. In addition, the traversal component associates the input objects MyItemRevision1 and MyItemRevision2 with Rules 1-6, because the object type for their type bucket 504 of MyItemRevision matches the source type for Rule 6 and the parent object type ItemRevision 412 (as shown in FIG. 4) for object type MyItemRevision of type bucket 504 matches the source type of ItemRevision for Rules 1-5.

With the input objects correlated to rules in this manner, the example traversal component may then perform set-based queries for each Rule2ObjectSet 602, 604, 606, 608, 610, 612 to acquire child objects related to the input objects 112. In example embodiments, the set-based queries may correspond to SQL queries based on the information provided by each rule with respect to the input objects associated with each rule in the Rule2ObjectSet. For example the traversal component may generate a SQL query for Rule1 such as:

```
SELECT t_02.puid, t_02.primary_object, t_02.secondary_object
FROM PIMANRELATION t_02 , PWORKSPACEOBJECT t_01
WHERE ( ( ( t_02.relation_type = 'IMAN_specification' AND
t_02.primary_object IN <inList> ) AND t_01.object_type =
'UGPART' ) AND t_02.secondary_object = t_01.puid )
```

In this example, the <inList> lists the object Ids for ItemRevision1, ItemRevision2, MyItemRevision1, MyItemRevision2, PartRevision1. Also in this example, "puid" returns the object Id of the relation object; "primary_object" returns the object Id of the source object (i.e., one of the input objects in the <inList>); "secondary_object" returns the object Id of the destination object (i.e. the other side object), which corresponds to the child object found for a particular source/input object. Further, the last two query clauses ensure that the type of the destination object must be "UGPART". Also, it should be appreciated that this example SQL query may be extended to retrieve further object data and may have a different and/or more complex join and where clauses depending on the organization of data in the data store.

The traversal component may also generate set-based queries for each of the other Rules 2-6 as well. Also, as discussed previously, such queries are carried out in precedence order. Thus, the determined set-based query for Rule 6 is carried out first and the set-based query for Rule 5 is a carried out last in the example described with respect to FIG. 6.

It should be appreciated that subsequent queries after the first query may produce child objects already found from prior queries. In an example embodiment, if a child object has already been found, the traversal component may forego duplicating the object in the list of child objects that is being compiled by the traversal component from the queries.

The traversal component may be operative to determine a set of child objects to be used for a next generation traversal.

Such a set of child objects may correspond to newly found child objects in the list of child objects that have not yet been the subject of a next generation traversal. The traversal component may then generate further Rule2ObjectSets (in the manner described previously) based on any newly found child-objects serving as a new set of input objects and carry out further set-based queries to determine further child-objects. Thus in this example the newly found child-objects for each further Rule2ObjectSet correspond to the <inList> objects in the SQL query for each Rule.

Similarly, the traversal component may then generate additional Rule2ObjectSets (in the manner described previously) based on any newly found further child-objects serving as a new set of input objects and carry out additional set-based queries to determine additional further child-objects. This process may continue in this iterative manner until no further child-objects are obtained from the set-based queries or if the rule specifies no further traversal.

For each child object added to the list of the child objects, the traversal component may also associate therewith which traversal rule initially retrieved the respective child object. Such rule/object associations may also be communicated to the application component. Thus after receiving the traversed objects from the traversal component, the application component may assign specific actions (such as deep copy) to the object caught by the "most appropriate rule" in the set (i.e., the traversal rule that initially retrieved the respective object).

As discussed previously with respect to FIG. 1, the set of all child objects 118 communicated to the application component 114 may be organized in child object data structures 120. Such data structures may represent determined relationships between the child objects and their corresponding source/input object (which may be another child object). The data structure may also list further child objects of each child object as well as the traversal rule that initially found the child object.

The following is an example of a format of a data structure for each child object that is generated by the described traversal component and communicated to an application component:

```
trvObjStruct
{
    parentObj
    childObj
    relationOrReferenceName
    ruleId
    childTrvObjStructList
}
```

Here the childObj data refers to the particular object Id of a found child object (i.e., the destination object the traversal query finds). Also, the parentObj data refers to the object Id of the source object that the traversal starts from (i.e., the source object returned by the query that corresponds to one of the input objects in the <inlist> for the query). In addition, the RelationOrReferenceName data specifies the name of the relation type object Id or reference property the traversal query is made for. Further, the ruleId data specifies the Id of the most qualified rule that finds the child object (i.e., the first rule that was used to retrieve the child object from the data store). In addition, the childTrvObj StructList data specifies a list of the traversed object Ids for the next generation of objects (i.e., further child objects) that may have been retrieved via processing the traversal rules with respect to child objects serving as the input objects of the corresponding query.

Figure 7:
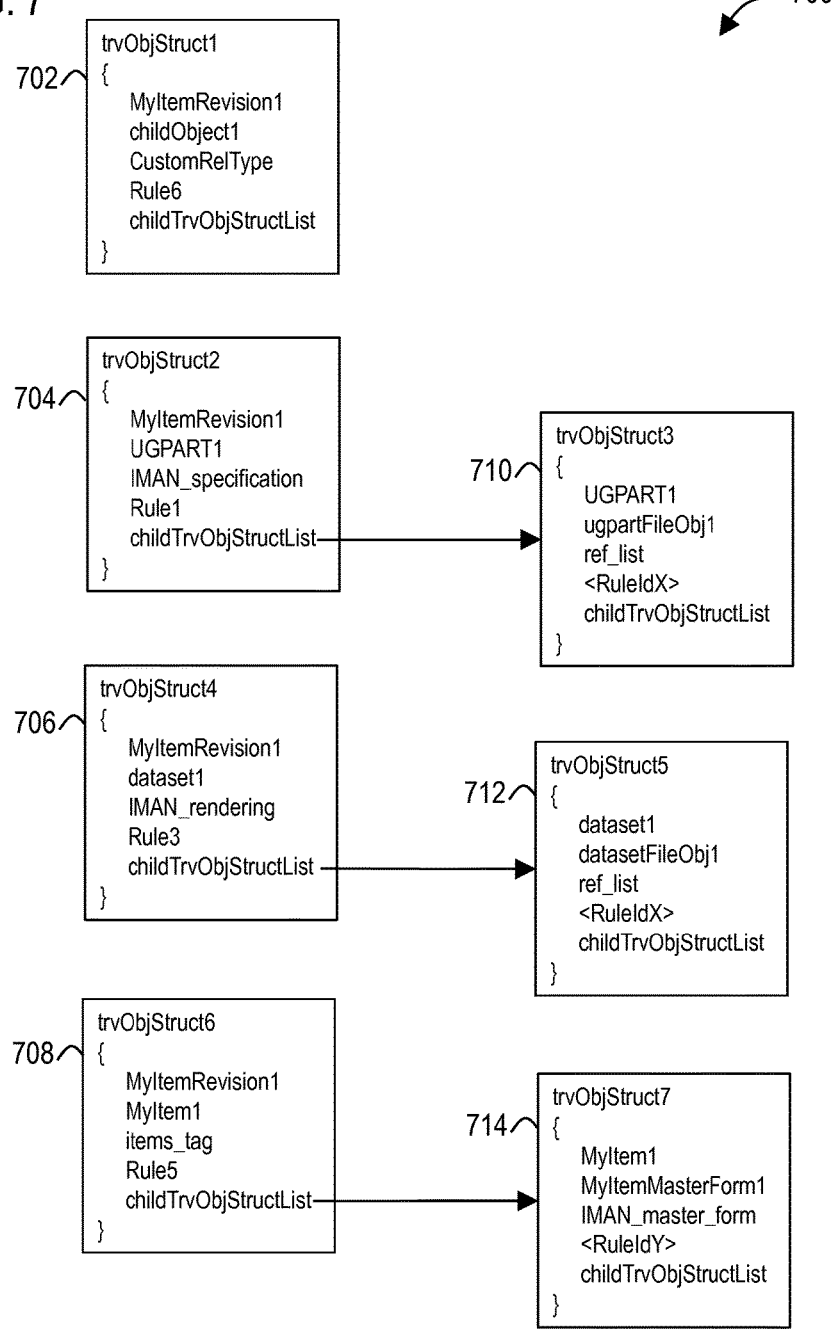
FIG. 7 illustrates an example of traversed child object data structures returned to an application component.

FIG. 7 illustrates an example of traversed child object data structures 700 that may be returned to an application component from the described traversal component for the example input object of MyItemRevision1 in which traversal rules Rule1, Rule3, Rule5, and Rule6 were successful in finding initial child objects 702, 704, 706 and 708 from the data store. Also, because the traversal rules were applied recursively to the found initial child objects serving as input objects, further child objects 710, 712, 714 (which are child of the initial child objects) were also found and are included in the child object data structures returned to the application component. The traversal rules may also have been applied to the further child objects 710, 712, 714 serving as input objects. However, in this example, no addition generations of child objects were retrieved from the data store.

In example embodiments, these described child object data structures communicated to an application component may be included in a single data structure, such as XML or JSON data structures, or any other arrangement that represents information determined by the described example traversal component for a received set of traversal rules and input objects.

In a production environment for a PLM database, the number of the applicable rules can be in magnitude of hundreds while the number of the types involved can be in the magnitude of tens for deep type hierarchies. It should be noted that in this example, only 6 database queries were made (one for each of the six Rules1-6), which for such a production environment can substantially improve performance and scale better. Such performance may be improved by the reduction in the amount of time it takes to identify child objects related to a received set of input objects compared to methods that repeatedly traverse through source type hierarchy, relation type hierarchy and destination type hierarchy for a given combination of source object, relation object, and destination object.

In the previously described example, a set-based query such as a SQL query for each rule was constructed from the parameters provided in each respective rule. However it should also be appreciated that rules may include custom traversal, in which the rules themselves provide the SQL query or a reference to a particular function that is being used to query the data store for child objects stored in the data store and/or runtime objects generated from data stored in the data store. This enables configuration rule-based traversal to be seamlessly integrated into the described traversal framework.

With reference now to FIGS. 8 and 9, various example methodologies are illustrated and described. While the methodologies are described as being a series of acts that are performed in a sequence, it is to be understood that the methodologies may not be limited by the order of the sequence. For instance, some acts may occur in a different order than what is described herein. In addition, an act may occur concurrently with another act. Furthermore, in some instances, not all acts may be required to implement a methodology described herein.

It is important to note that while the disclosure includes a description in the context of a fully functional system and/or a series of acts, those skilled in the art will appreciate that at least portions of the mechanism of the present disclosure and/or described acts are capable of being distributed in the form of computer-executable instructions contained within non-transitory machine-usable, computer-usable, or computer-readable medium in any of a variety of forms, and that the present disclosure applies equally regardless of the particular type of instruction or signal bearing medium or storage medium utilized to actually carry out the distribution. Examples of non-transitory machine usable/readable or computer usable/readable mediums include: ROMs, EPROMs, magnetic tape, floppy disks, hard disk drives, SSDs, flash memory, CDs, DVDs, and Blu-ray disks. The computer-executable instructions may include a routine, a sub-routine, programs, applications, modules, libraries, a thread of execution, and/or the like. Still further, results of acts of the methodologies may be stored in a computer-readable medium, displayed on a display device, and/or the like.

Referring now to FIG. 8, a methodology 800 that facilitates providing object traversal is illustrated. The methodology 800 begins at 802, and at 804 the methodology includes an act of receiving traversal parameters which may include a set of input objects of different types and a set of traversal rules. The methodology at 806 may also include sorting traversal rules once in terms of precedence order based firstly on source type, secondly on relationship type, and thirdly on destination type. At 808, the methodology may include sorting the input objects into type buckets. Also at 810 the methodology may include sorting the input objects into a Rule2ObjectSets based on the type buckets and the sorted traversal rules.

The example methodology 800 further includes an act 812 of performing a set-based query for each traversal rule from highest to lowest precedence order for the respective input objects associated with the respective traversal rule in the Rule2ObjectSet in order to receive a set of related child objects from a data store. As illustrated in FIG. 8, the type of set-based query carried out may depend on the type of traversal parameters provided in the traversal rule. For example, the act 812 may include the act 814 of carrying out a set-based relation traversal query based on relationships defined by relation type between source and destination object types included in the rule. Also for example, act 812 may include the act 816 of carrying out a set-based reference traversal query based on references (via property names) between source and destination object types. Further for example, act 812 may include the act 818 of carrying out custom-based traversal based on a custom function or SQL query specified by the rule.

Continuing with FIG. 8, the example methodology 800 may include an act 820 of filtering out child objects already processed or where a custom condition is not met. In addition, act 822 of the methodology 800 may include constructing a traversed child object data structure for each child object found by the rules. Also, act 824 of the methodology may include determining a child-object set of child-objects not previously found for the next generation of traversal (i.e., to determine further child objects). The methodology may include an act 826 of making a decision as to whether the child object set is empty. When the child object set is not empty the methodology may repeat acts 808 to 826 with respect to the determined set of child objects for the next generation of traversal. When the child object set is empty the methodology may include the act 828 of returning the traverse child object data structures from act 822 to an application for post-traversal processing (e.g., export objects, deep copy objects, deep-delete objects). At 830 the methodology may end.

Referring to FIG. 9, another example methodology 900 that facilitates providing object traversal is illustrated. This methodology 900 begins at 902, and at 904 the methodology may include the act of through operation of at least one processor, receiving a list of input objects and a set of traversal rules, wherein each rule specifies a source type of object. In addition, the methodology may include the act 906 of through operation of the at least one processor, determining a number of parent types for each source type in a hierarchical arrangement that specifies relationships between object types. Further, at 908 the methodology may include through operation of the at least one processor, determining a precedence order for the traversal rules based at least in part on the determined number of parent types for the source type of each respective rule. In addition, at 910 the methodology may include through operation of the at least one processor, processing the traversal rules in the determined precedence order for the received list of input objects to recursively acquire from a data store a list of child objects related to the input objects based on the traversal rules. At 912 the methodology may end.

In addition, the methodology 900 may include other acts and features discussed previously with respect to the system 100. For example, the act 910 of processing each respective traversal rule may comprise for each respective traversal rule carrying out a set based query on the data store to determine child objects to add to the list of child objects for a plurality of the input objects having one of a type or a parent type corresponding to the source type specified by the respective traversal rule.

In addition the methodology 900 may further include for each respective traversal rule, carrying out a set based query on the data store to determine further child objects to add to the list of child objects for a plurality of the child objects having one of a type or a parent type corresponding to the source type specified by the respective traversal rule.

Further, in example embodiments, the act 908 of determining the precedence order may include: determining a level number for the source type of each traversal rule based on a number of parent types for the source type in the hierarchical arrangement that specifies relationships between object types; and sorting the traversal rules in the precedence order based on the determined level number of the source type. Also, the act 910 of processing the traversal rules may include processing the traversal rules based on the precedence order from highest to lowest precedence. As discussed previously traversal rules with a higher level number corresponding to a higher number of parent types for a source type may have a higher precedence than traversal rules with a relatively lower level number corresponding to a relatively lower number of parent types for a source type. Also in example embodiments, determining the level number for the source type of each traversal rule may include carrying out a bottom-up traversal of data representative of the hierarchical arrangement in the data store starting from the source type specified by the traversal rule.

As discussed previously, each traversal rule may specify the source type of object, a destination type of object, and a relationship between the source type of object and the destination type of object. The example methodology 900 may further include determining a level number for the relationship of a traversal rule based on a number of parent types for the relationship in the hierarchical arrangement that specifies relationships between object types. Also the methodology 900 may include determine a level number for the destination type of a traversal rule based on a number of parent types for the relationship in the hierarchical arrangement that specifies relationships between object types. In this described embodiment, determining the precedence order may then include sorting traversal rules based firstly on the level number determined for the source type, secondly based on the level number determined for the relationship, and thirdly based on a level number determined for the destination type of object.

In example embodiments, for traversal rules with the same determined level number for a source type, determining the precedence order in the example methodology 900 may include sorting such traversal rules so that a traversal rule specifying a particular relation type of relationship is ordered higher than an instruction to match all relationships (e.g., a "Match All" instruction). Also for traversal rules with the same determined level number for a source type and the same determined level number for a relationship, determining the precedence order in the example methodology 900 may include sorting such traversal rules so that a traversal rule that specifies a particular destination type is ordered higher than an instruction to match all destination types (e.g., a "Match All" instruction).

Also, as discussed previously, the described processing and further processing of the traversal rules may include foregoing adding child objects and further child objects to the list of child objects that are already in the list of child objects.

In addition, the methodology 900 may include communicating to an application software component that provided the list of input objects and the traversal rules, at least one data structure for the child objects in the list of child objects, which at least one data structure includes data specifying each respective child object, the source object related to the respective child object, the relationship (e.g., the relation type or reference property) between the respective child object and source object, a list of determined further child objects related to the respective child object, and the traversal rule that initially determined the respective child object.

As discussed previously, such acts associated with these methodologies may be carried out by one or more processors. Such processor(s) may be included in one or more data processing systems for example that execute software components operative to cause these acts to be carried out by the one or more processors. In an example embodiment, such software components may be written in software environments/languages/frameworks such as Java, JavaScript, Python, C, C#, C++ or any other software tool capable of producing components and graphical user interfaces configured to carry out the acts and features described herein.

FIG. 10 illustrates a block diagram of a data processing system 1000 (also referred to as a computer system) in which an embodiment can be implemented, for example as a portion of a PLM system operatively configured by software or otherwise to perform the processes as described herein, and in particular as each one of a plurality of interconnected and communicating systems as described herein. The data processing system depicted includes at least one processor 1002 (e.g., a CPU) that may be connected to one or more bridges/controllers/buses 1004 (e.g., a north bridge, a south bridge). One of the buses 1004 for example may include one or more I/O buses such as a PCI Express bus. Also connected to various buses in the depicted example may include a main memory 1006 (RAM) and a graphics controller 1008. The graphics controller 1008 may be connected to one or more displays 1010. It should also be noted that in some embodiments one or more controllers (e.g., graphics, south bridge) may be integrated with the CPU (on the same chip or die). Examples of CPU architectures include IA-32, x86-64, and ARM processor architectures.

Other peripherals connected to one or more buses may include communication controllers 1012 (Ethernet controllers, WiFi controllers, cellular controllers) operative to connect to a local area network (LAN), Wide Area Network (WAN), a cellular network, and/or other wired or wireless networks 1014 or communication equipment.

Further components connected to various busses may include one or more I/O controllers 1016 such as USB controllers, Bluetooth controllers, and/or dedicated audio controllers (connected to speakers and/or microphones). It should also be appreciated that various peripherals may be connected to the USB controller (via various USB ports) including input devices 1018 (e.g., keyboard, mouse, touch screen, trackball, camera, microphone, scanners), output devices 1020 (e.g., printers, speakers) or any other type of device that is operative to provide inputs or receive outputs from the data processing system. Further it should be appreciated that many devices referred to as input devices or output devices may both provide inputs and receive outputs of communications with the data processing system. Further it should be appreciated that other peripheral hardware 1022 connected to the I/O controllers 1016 may include any type of device, machine, or component that is configured to communicate with a data processing system.

Additional components connected to various busses may include one or more storage controllers 1024 (e.g., SATA). A storage controller may be connected to a storage device 1026 such as one or more storage drives and/or any associated removable media, which can be any suitable non-transitory machine usable or machine readable storage medium. Examples, include nonvolatile devices, volatile devices, read only devices, writable devices, ROMs, EPROMs, magnetic tape storage, floppy disk drives, hard disk drives, solid-state drives (SSDs), flash memory, optical disk drives (CDs, DVDs, Blu-ray), and other known optical, electrical, or magnetic storage devices drives and/or computer media. Also in some examples, a storage device such as an SSD may be connected directly to an I/O bus 1004 such as a PCI Express bus.

A data processing system in accordance with an embodiment of the present disclosure may include an operating system 1028, software/firmware 1030, and data stores 1032 (that may be stored on a storage device 1026). Such an operation system may employ a command line interface (CLI) shell and/or a graphical user interface (GUI) shell. The GUI shell permits multiple display windows to be presented in the graphical user interface simultaneously, with each display window providing an interface to a different application or to a different instance of the same application. A cursor or pointer in the graphical user interface may be manipulated by a user through a pointing device such as a mouse or touch screen. The position of the cursor/pointer may be changed and/or an event, such as clicking a mouse button or touching a touch screen, may be generated to actuate a desired response. Examples of operating systems that may be used in a data processing system may include Microsoft Windows, Linux, UNIX, iOS, and Android operating systems.

The communication controllers 1012 may be connected to the network 1014 (not a part of data processing system 1000), which can be any public or private data processing system network or combination of networks, as known to those of skill in the art, including the Internet. Data processing system 1000 can communicate over the network 1014 with one or more other data processing systems such as a server 1034 (also not part of the data processing system 1000). However, an alternative data processing system may correspond to a plurality of data processing systems implemented as part of a distributed system in which processors associated with several data processing systems may be in communication by way of one or more network connections and may collectively perform tasks described as being performed by a single data processing system. Thus, it is to be understood that when referring to a data processing system, such a system may be implemented across several data processing systems organized in a distributed system in communication with each other via a network.

Further, the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely.

In addition, it should be appreciated that data processing systems may be implemented as virtual machines in a virtual machine architecture or cloud environment. For example, the processor 1002 and associated components may correspond to a virtual machine executing in a virtual machine environment of one or more servers. Examples of virtual machine architectures include VMware ESCi, Microsoft Hyper-V, Xen, and KVM.

Those of ordinary skill in the art will appreciate that the hardware depicted for the data processing system may vary for particular implementations. For example the data processing system 1000 in this example may correspond to a computer, workstation, and/or a server. However, it should be appreciated that alternative embodiments of a data processing system may be configured with corresponding or alternative components such as in the form of a mobile phone, tablet, controller board or any other system that is operative to process data and carry out functionality and features described herein associated with the operation of a data processing system, computer, processor, and/or a controller discussed herein. The depicted example is provided for the purpose of explanation only and is not meant to imply architectural limitations with respect to the present disclosure.

As used herein, the terms "component" and "system" are intended to encompass hardware, software, or a combination of hardware and software. Thus, for example, a system or component may be a process, a process executing on a processor, or a processor. Additionally, a component or system may be localized on a single device or distributed across several devices.

Also, as used herein a processor corresponds to any electronic device that is configured via hardware circuits, software, and/or firmware to process data. For example, processors described herein may correspond to one or more (or a combination) of a microprocessor, CPU, FPGA, ASIC, or any other integrated circuit (IC) or other type of circuit that is capable of processing data in a data processing system, which may have the form of a controller board, computer, server, mobile phone, and/or any other type of electronic device.

Those skilled in the art will recognize that, for simplicity and clarity, the full structure and operation of all data processing systems suitable for use with the present disclosure is not being depicted or described herein. Instead, only so much of a data processing system as is unique to the present disclosure or necessary for an understanding of the present disclosure is depicted and described. The remainder of the construction and operation of data processing system 1000 may conform to any of the various current implementations and practices known in the art.

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, act, or function is an essential element which must be included in the claim scope: the scope of patented subject matter is defined only by the allowed claims. Moreover, none of these claims are intended to invoke 35 USC § 112(f) unless the exact words "means for" are followed by a participle.

What is claimed is:

1. A system comprising:
a memory; and
at least one processor configured to:
  receive a set of traversal rules and the list of input objects, wherein each rule specifies a source type of object;
  determine a number of parent types for each source type in a hierarchical arrangement that specifies relationships between object types;
  determine a precedence order for the traversal rules based at least in part on the determined number of parent types for the source type of each respective rule;
  process a received set of traversal rules in the determined precedence order for the received list of input objects to recursively acquire from a data store a list of child objects related to the input objects based on the traversal rules, including, for each respective traversal rule, carrying out a set based query on the data store to determine child objects and further child objects to add to the list of child objects for a plurality of the input objects having one of a type or a parent type corresponding to the source type specified by the respective traversal rule;
  construct a child object data structure for each child object in the list of child objects, wherein the child object data structure includes data specifying each respective child object, a source object related to the respective child object, a relationship between the respective child object and source object, a list of determined further child objects related to the respective child object, and the traversal rule that initially determined the respective child object; and
  send the child object data structures to an application software component.

2. The system according to claim 1, wherein the at least one processor is further configured to:
  determine a level number for the source type of each traversal rule based on a number of parent types for the source type in the hierarchical arrangement that specifies relationships between object types,
  sort the traversal rules in the precedence order based on the determined level number of the source type, and
  process the traversal rules based on the precedence order from highest to lowest precedence, wherein traversal rules with a higher level number corresponding to a higher number of parent types for a source type have a higher precedence than traversal rules with a relatively lower level number corresponding to a relatively lower number of parent types for a source type.

3. The system according to claim 2, wherein the at least one processor is further configured to determine the level number for the source type of each traversal rule by carrying out a bottom-up traversal of data representative of the hierarchical arrangement in the data store starting from the source type specified by the traversal rule.

4. The system according to claim 2, wherein each traversal rule specifies the source type of object, a destination type of object, and a relationship between the source type of object and the destination type of object, and wherein the at least one processor is further configured to:
determine a level number for the relationship of a traversal rule based on a number of parent types for the relationship in the hierarchical arrangement that specifies relationships between object types, and
determine a level number for the destination type of a traversal rule based on a number of parent types for the destination type in the hierarchical arrangement that specifies relationships between object types, wherein the precedence order is determined by sorting traversal rules firstly based on the level number determined for the source type, secondly based the level number determined for the relationship, and thirdly based on a level number determined for the destination type of object.

5. The system according to claim 4, wherein for traversal rules with the same determined level number for a source type, and the at least one processor is further configured to:
determine the precedence order by sorting such traversal rules so that a traversal rule specifying a particular relation type of relationship is ordered higher than an instruction to match all relationships, wherein for traversal rules with the same determined level number for a source type and the same determined level number for a relationship, and
determine the precedence order by sorting such traversal rules so that a traversal rule specifying a particular destination type is ordered higher than an instruction to match all destination types.

6. The system according to claim 4, wherein the at least one processor is further configured to forego adding child objects and further child objects to the list of child objects that are already in the list of child objects.

7. The system according to claim 1, the traversal rules and the list of input objects are received from the application component.

8. A method comprising:
through operation of at least one processor, receiving a list of input objects and a set of traversal rules, wherein each rule specifies a source type of object;
through operation of the at least one processor, determining a number of parent types for each source type in a hierarchical arrangement that specifies relationships between object types;
through operation of the at least one processor, determining a precedence order for the traversal rules based at least in part on the determined number of parent types for the source type of each respective rule;
through operation of the at least one processor, processing the traversal rules in the determined precedence order for the received list of input objects to recursively acquire from a data store a list of child objects related to the input objects based on the traversal rules, including, for each respective traversal rule, carrying out a set based query on the data store to determine child objects and further child objects to add to the list of child objects for a plurality of the input objects having one of a type or a parent type corresponding to the source type specified by the respective traversal rule;
through operation of the at least one processor, constructing a child object data structure for each child object in the list of child objects, wherein the child object data structure includes data specifying each respective child object, a source object related to the respective child object, a relationship between the respective child object and source object, a list of determined further child objects related to the respective child object, and the traversal rule that initially determined the respective child object; and
through operation of the at least one processor, sending the child object data structures to an application software component.

9. The method according to claim 8, wherein determining the precedence order includes:
determining a level number for the source type of each traversal rule based on a number of parent types for the source type in the hierarchical arrangement that specifies relationships between object types; and
sorting the traversal rules in the precedence order based on the determined level number of the source type,
wherein processing the traversal rules includes processing the traversal rules based on the precedence order from highest to lowest precedence, wherein traversal rules with a higher level number corresponding to a higher number of parent types for a source type have a higher precedence than traversal rules with a relatively lower level number corresponding to a relatively lower number of parent types for a source type.

10. The method according to claim 9, wherein determining the level number for the source type of each traversal rule includes carrying out a bottom-up traversal of data representative of the hierarchical arrangement in the data store starting from the source type specified by the traversal rule.

11. The method according to claim 9, wherein each traversal rule specifies the source type of object, a destination type of object, and a relationship between the source type of object and the destination type of object, further comprising:
determining a level number for the relationship of a traversal rule based on a number of parent types for the relationship in the hierarchical arrangement that specifies relationships between object types;
determining a level number for the destination type of a traversal rule based on a number of parent types for the destination type in the hierarchical arrangement that specifies relationships between object types,
wherein determining the precedence order includes sorting traversal rules based firstly on the level number determined for the source type, secondly based on the level number determined for the relationship, and thirdly based on a level number determined for the destination type of object.

12. The method according to claim 11, wherein for traversal rules with the same determined level number for a source type, determining the precedence order includes sorting such traversal rules so that a traversal rule specifying a particular relation type of relationship is ordered higher than an instruction to match all relationships, wherein for traversal rules with the same determined level number for a source type and the same determined level number for a relationship, determining the precedence order includes sorting such traversal rules so that a traversal rule that specifies a particular destination type is ordered higher than an instruction to match all destination types.

13. The method according to claim 11, wherein processing and further processing the traversal rules includes foregoing adding child objects and further child objects to the list of child objects that are already in the list of child objects.

14. A non-transitory computer readable medium encoded with executable instructions that when executed, cause at least one processor to carry out a method comprising:
   receiving a list of input objects and a set of traversal rules, wherein each rule specifies a source type of object;
   determining a number of parent types for each source type in a hierarchical arrangement that specifies relationships between object types;
   determining a precedence order for the traversal rules based at least in part on the determined number of parent types for the source type of each respective rule;
   processing the traversal rules in the determined precedence order for the received list of input objects to recursively acquire from a data store a list of child objects related to the input objects based on the traversal rules, including, for each respective traversal rule, carrying out a set based query on the data store to determine child objects and further child objects to add to the list of child objects for a plurality of the input objects having one of a type or a parent type corresponding to the source type specified by the respective traversal rule;
   constructing a child object data structure for each child object in the list of child objects, wherein the child object data structure includes data specifying each respective child object, a source object related to the respective child object, a relationship between the respective child object and source object, a list of determined further child objects related to the respective child object, and the traversal rule that initially determined the respective child object; and
   sending the child object data structures to an application software component.

* * * * *